Sept. 26, 1933.  J. M. MANCUSO ET AL  1,928,066
ROUGHING WHEEL
Filed Nov. 11, 1932
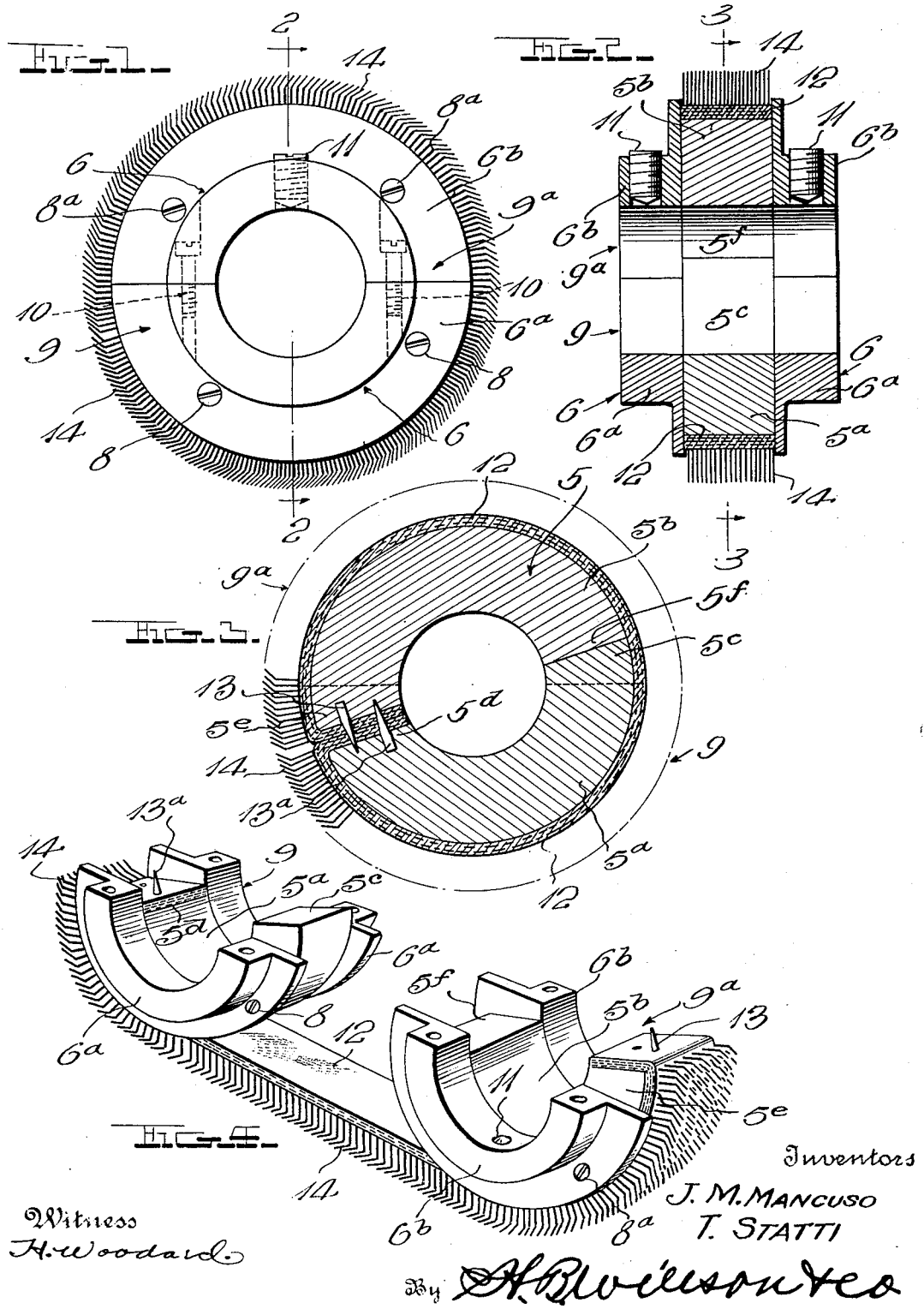
Inventors
J. M. Mancuso
T. Statti Patented Sept. 26, 1933

1,928,066

UNITED STATES PATENT OFFICE 1,928,066

ROUGHING WHEEL

John M. Mancuso, Utica, and Thomas Statti, Oneida, N. Y.

Application November 11, 1932
Serial No. 642,288

1 Claim. (Cl. 69—1)

The invention relates to a wheel for mounting on the shaft of a shoe finishing machine for the purpose of roughening leather or leather taps, welts and uppers on McKay shoes to remove all loose flesh on the leather, raise a nap and leave small grooves in which to apply leather cement for the purpose of cementing half soles, full soles, taps, leather pieces or the like in place, without the use of nails, wire or stitches.

The object of the invention is to provide an exceptionally simple and inexpensive wheel construction which forms a rigid unitary structure when applied and is readily applicable to a shaft without the necessity of stripping the latter of other wheels and the like and sliding the roughing wheel endwise thereon.

With the foregoing in view, the invention resides in the novel subject matter hereinafter described and claimed, description being accomplished by reference to the accompanying drawing.

Fig. 1 is a side elevation of the improved roughing wheel.

Fig. 2 is a vertical sectional view on line 2—2 of Fig. 1.

Fig. 3 is a vertical sectional view on the plane indicated by the line 3—3 of Fig. 2.

Fig. 4 is a perspective view showing the two sections of the wheel swung outwardly from engagement with each other.

A preferred construction has been illustrated and will be specifically described, with the understanding however, that within the scope of the invention as claimed, minor variations may be made.

In the drawing above briefly described, the numeral 5 denotes an inner collar which may well be formed of wood, said collar being composed of two semi-circular sections 5ª and 5ᵇ. Two outer collars 6, preferably formed of metal, are provided at opposite sides of the collar 5, in co-axial relation with the latter, and while the inner peripheries of the three collars 5 and 6 are flush with each other, said collars 6 are of greater radial length than said collar 5, so that said collars 6 project radially beyond the collar 5. By means of screws 8, the collar sections 6ª are secured against opposite sides of the collar section 5ª, and by means of screws 8ª, the collar section 6ᵇ are secured against opposite sides of the collar section 5ᵇ. The collar sections thus secured together, form two composite semi-circular wheel sections 9 and 9ª, and it will be observed that the ends of said collar sections are offset circumferentially so that one end 5ᶜ of the collar section 5ª projects beyond the corresponding ends of the collar sections 6ª, and the opposite end 5ᵈ of said section 5ª is inwardly spaced from the corresponding ends of said sections 6ª. Similarly, one end 5ᵉ of the collar section 5ᵇ projects beyond the corresponding ends of the collar sections 6ᵇ, while the opposite end 5ᶠ of said collar section 5ᵇ is inwardly spaced from the adjacent ends of said collar sections 6ᵇ. Thus, the two semi-circular wheel sections 9 and 9ª are provided with portions which interfit at their ends, holding said sections against any relative movement longitudinally of the wheel axis and providing a structure which when assembled will be more rigid than could otherwise be obtained.

Screws 10 are provided to secure the ends of the collar sections 6ª to the ends of the collar sections 6ᵇ, thereby holding the composite wheel sections 9 and 9ª upon the shaft. To overcome liability of the shaft turning within the wheel, set screws 11 may be provided.

A flexible band 12 lies against the outer periphery of the collar 5 between the projecting edges 7 of the collars 6, the ends of said band being turned inwardly upon the ends 5ᵈ and 5ᵉ of the collar 5, and being secured by spurs 13 and 13ª, carried by said collar ends. The band 12 carries angular wire fingers 14 which perform the required roughening of the leather or the like.

When the screws 10 are removed, the two wheel sections 9 and 9ª may be moved apart as shown in Fig. 4, allowing them to be readily placed on opposite sides of the shaft. When the screws 10 are re-inserted and tightened, and the set screws 11 are tightened, the wheel will be securely held upon the shaft in readiness for operation. Separation of the wheel sections 9 and 9ª also facilitates removal of one band 12 and substitution of another. No claim is herein made to this band and its fingers 14, for this finger-equipped band may be purchased upon the market.

It will be seen from the foregoing that a novel and advantageous structure has been provided for carrying out the object of the invention, and while the details disclosed are preferred, attention is again invited to the fact that variations may be made within the scope of the invention as claimed.

We claim:—

A device of the class described comprising an inner shaft-encircling collar formed of two semi-circular sections; two outer shaft-encircling collars co-axial with said inner collar, projecting radially beyond the latter and each formed of two semi-circular sections; means securing said outer collar sections against opposite sides of said inner collar sections to form two composite semi-circular wheel sections; the ends of said semi-circular inner collar sections being offset circumferentially from the ends of said semi-circular outer collar sections to provide the ends of said semi-circular wheel sections with interfitting portions; a work-performing band surrounding said inner collar and having inturned ends anchored to ends of the semi-circular sections of said inner collar, and means for securing said semi-circular sections of said outer collars together to hold the two semi-circular wheel sections upon a shaft.

THOMAS STATTI.
JOHN M. MANCUSO.